H. G. CARR.
GEARING.
APPLICATION FILED FEB. 8, 1910.

1,005,101.

Patented Oct. 3, 1911.
3 SHEETS—SHEET 3.

WITNESSES:
G. Robert Thomas
John K. Bachrog

INVENTOR
Howard G. Carr
BY Munn & Co.
ATTORNEYS

UNITED STATES PATENT OFFICE.

HOWARD G. CARR, OF HOOPESTON, ILLINOIS.

GEARING.

1,005,101.  Specification of Letters Patent.  Patented Oct. 3, 1911.

Application filed February 8, 1910. Serial No. 542,664.

*To all whom it may concern:*

Be it known that I, HOWARD G. CARR, a citizen of the United States, and a resident of Hoopeston, in the county of Vermilion and State of Illinois, have invented a new and Improved Gearing, of which the following is a full, clear, and exact description.

This invention relates to gearing for motor vehicles, and has reference more particularly to a self-propelled vehicle which is driven by an internal combustion motor mounted adjacent to the driving wheels, and connected with the driving wheels by my improved form of variable speed gearings.

The object of the invention is to provide a motor vehicle in which the engine is mounted adjacent to the driving axle and is operatively connected therewith by means of efficient and compact, variable speed gearing, which permits the vehicle to be driven at different speeds and in different directions, which dispenses with a shaft or chains for operatively connecting the engine shaft and the driving axle, and in which the mechanism is so arranged that it can be easily assembled and taken apart and is accessible without difficulty, for purposes of repair or for other reasons.

The invention consists in the construction and combination of parts to be more fully described hereinafter and particularly set forth in the claims.

Reference is to be had to the accompanying drawings forming part of this specification, in which similar characters of reference indicate corresponding parts in all the views, and in which—

Figure 1:
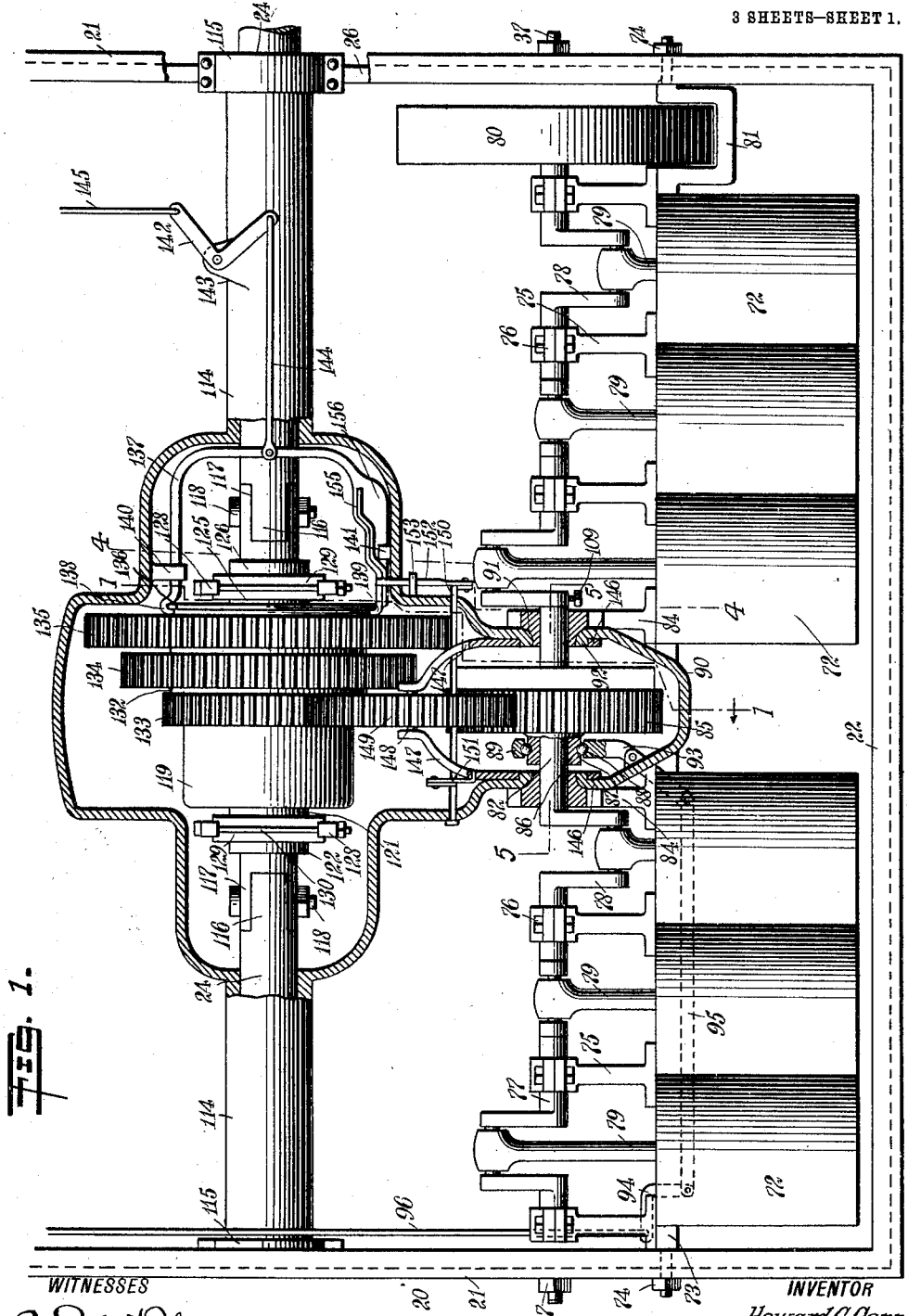
Figure 2:
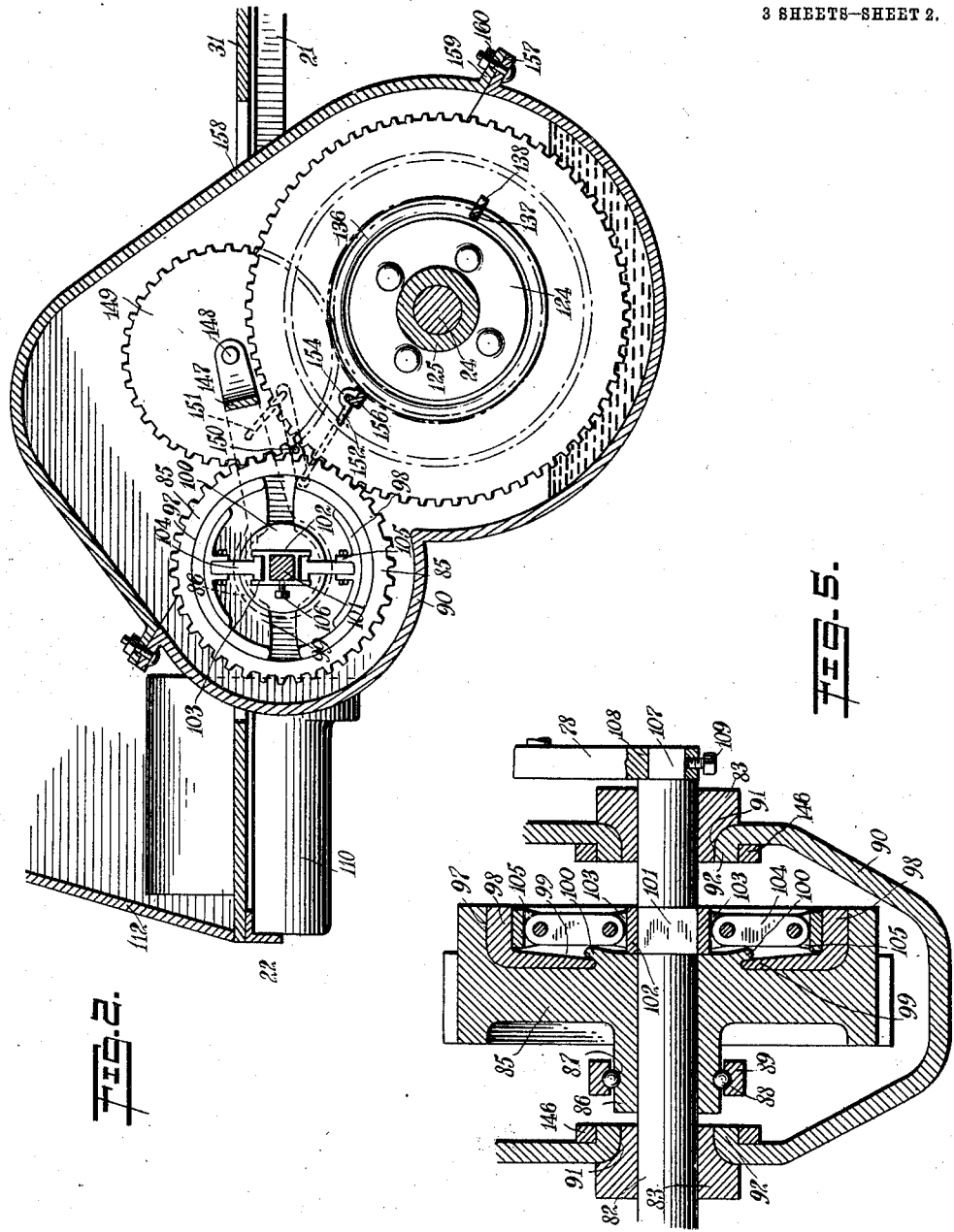
Figure 3:
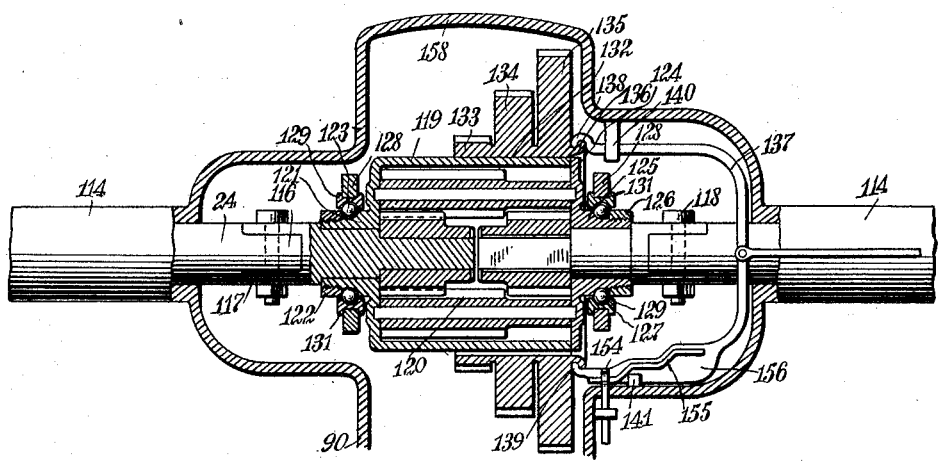
Figure 4:
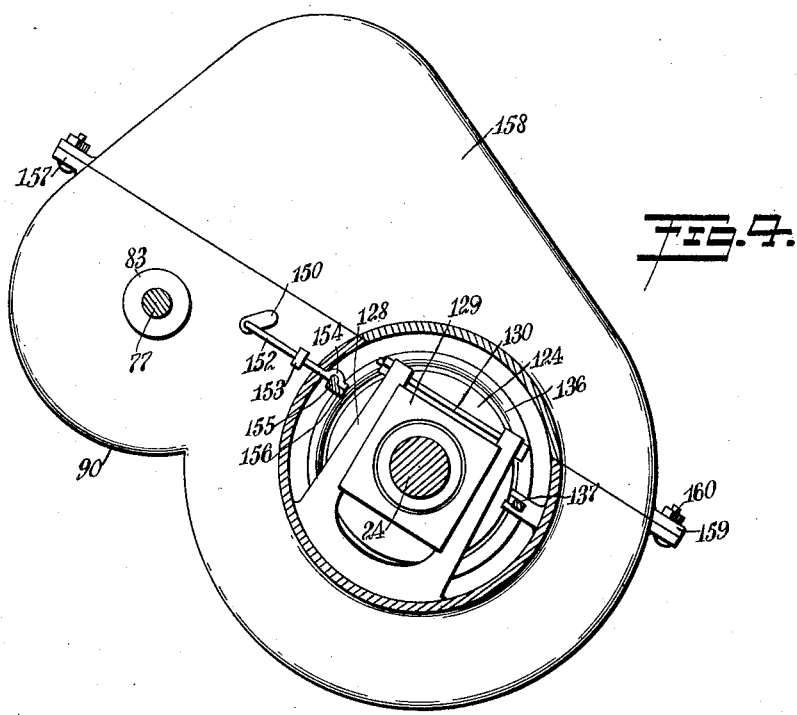

Figure 1 is an enlarged plan view of the rear of the chassis of a motor vehicle, showing the engine for driving the vehicle, and in cross section, the gearing connecting the engine and the driving axle; Fig. 2 is a transverse section on the line 6—6 of Fig. 1; Fig. 3 is a longitudinal section showing part of the driving axle, the change speed gearing, and the differential; Fig. 4 is a transverse section on the line 4—4 of Fig. 1; and Fig. 5 is an enlarged, transverse section on the line 5—5 of Fig. 1, showing the clutch.

Referring more particularly to the drawings, I have shown a vehicle in which the motor is mounted at the rear of the frame, adjacent to the driving axle 24, and may consist of any suitable number of cylinders. I prefer to employ, as shown in the drawings, six cylinders 72, which are arranged in sets of three, either cast separately or together. These cylinders are provided with suitable valve mechanism of any type adapted for the purpose, and constitute internal combustion cylinders such as are usually employed in motors of this kind. The cylinders are mounted upon the engine support 73, which extends transversely of the frame and is secured at the ends, to the side members 21 of the chassis. The frame has forwardly extending arms 75 provided at the ends with bearings 76 in which is journaled the crank shaft 77 provided with cranks 78. These are connected in the usual manner with the piston rods 79 which operate with the cylinders 72. At one end, the shaft 77 carries a fly-wheel 80.

The section 82 of the shaft 77 between the two sets of cylinders is journaled in hubs 83 carried by brackets 84 secured to the support 73. A gear-wheel 85 is loosely mounted upon the shaft section 82 and has a hub 86 presenting a ball race 87 which receives ball bearings 88 encompassed by a ring 89. A gear case 90 has openings 91 with inwardly disposed edge flanges 92, the openings receiving the collars 83. A lever 93 is connected with the ring 89 and is pivotally mounted upon the case 90. A bell crank 94 is pivotally mounted at one end of the support 73 and is connected with the lever 93 by means of a link 95. A manipulating rod 96 is secured to the other arm of the bell crank 94 and is provided with means, not shown, whereby it can be actuated by the operator of the vehicle to shift the lever 93, and thereby to move the gear 85 longitudinally of the shaft section 82.

The gear wheel 85 has at the side opposite the hub 86 a recessed clutch face 97 within which are correspondingly formed clutch members 98. These have flanges 99 slidably engaging in a groove formed by an outwardly disposed rib 100 concentric with the gear wheel. The shaft section 82 has a part 101 of angular section, upon which is mounted a frame 102 which is thus constrained to rotate with the shaft section 82. The frame has spaced ears 103 between which are pivotally mounted links 104, pivotally connected with ears 105 of the members 98. The frame is secured in place by means of a set screw 106. It will be understood that by forcing the gear 85 toward the clutch sections these are moved outwardly so that the links are alined and thus force the clutch sections into operative engagement with the clutch face 97 so that the gear is operatively connected thereby with the shaft section 82. By moving the gear 85 in the opposite direction the parts are disengaged so that the clutch members 98 revolve loosely within the gear face, and the gear 85 is not driven by the shaft.

The shaft 77 comprises two parts, one of which includes the section 82. The latter, at one end has an extension 107 of angular section, which is received by a correspondingly formed opening 108 in one of the crank arms 78 which is secured thereon by means of a set screw 109, whereby the two parts of the shaft can be removably associated. This arrangement is for the purpose of facilitating the taking apart and assembling of the motor.

Underneath the motor is a casing 110 secured to the rear member 22 of the frame and to the floor 31, which is cut away to receive the engine. The casing 110 has a downwardly curved part 111 to allow for the play of the cranks and to contain lubricant to permit the splash lubrication of these parts. A hood or cover 112 is mounted over the engine and has a hinged lid 113 by means of which access to the engine is possible.

The gear case 90 extends downwardly and forwardly under the rear axle 24, and has laterally extended, reduced sleeves 114 in which the axle is rotatably positioned. At the ends of the sleeves are boxings 115 to which the carriers 34 are secured by the bolts 37. The axle 24 is formed in separable parts, the outer of which have the ends extending from the sleeves 114 into the main part of the gear case. The outer parts of the axle have reduced ends 116 which are received by bifurcated ends 117 of the intermediate axle section, being secured to the last-mentioned section by means of bolts 118 fitting in transverse, registering openings of the parts. The intermediate section is of course located within the gear case and carries a drum 119 within which is located a differential 120, the intermediate axle section being formed in two parts for this purpose. The differential may be of any suitable form and as shown for example herewith, may correspond to that illustrated in the United States patent to Mooers, re-issue, June 1, 1909, No. 12966. Any other suitable form of differential may be employed if so desired.

The drum 119 at one end is extended to form a hub 121 having a removable ring 122 with which it forms a race for ball bearings 123. At the other end the drum has a head 124 provided with a hub 125 similar to the hub 121 and likewise provided with a removable ring 126 forming with the hub, a race for ball bearings 127. Within the gear case, adjacent to the hubs 121 and 125, are spaced guide supports or arms 128 between which are slidably mounted bearing blocks 129 held in position by cross bolts 130 connecting the upper ends of the guide supports 128. The bearing blocks 129 have in the sides guide grooves or recesses 131 which slidably receive the guide supports 128 and form bearing races for the balls 123 and 127 to support rotatably the intermediate axle portion. It will be understood that the sectional construction of the axle facilitates the assembling of the parts and permits them to be separated without difficulty for purposes of repair and replacement.

Slidably mounted upon the drum 119 is an annular member 132 which has integral therewith a number of gears. These may be, as shown for example, three in number, and of different diameters, consisting respectively of a small gear 133, an intermediate gear 134, and a larger gear 135. An annular rib or flange 136 is formed at one end of the member 132 and extends laterally therefrom. A controlling member 137 of substantially U-form is mounted within the gear case at one side of the drum 119, and at the ends has curved fingers 138 and 139 slidably in engagement at the rib 136. Guide projections 140 and 141 are formed inside of the gear case and movably engage the member 137 to regulate the adjustment thereof. A bell crank lever 142 is pivotally mounted upon a boss or extension 143 of one of the sleeves 114 and is operatively connected with the member 137 by means of a pivoted link 144. A controlling rod 145 operatively connects the lever 142 with a manually operable device within reach of the driver of the machine, by means of which he can shift the controlling member 137.

The inwardly disposed edge flanges 92 of the gear case encompassing the shaft 82 have movably mounted thereon annular collars 146 carrying forwardly extending arms 147, the ends of which are inwardly disposed and have journaled therebetween a spindle 148 carrying a gear 149. A shaft 150 is journaled in the gear case between the gear 85 and the member 132 and is connected with one of the arms 147 by means of a link 151, the shaft 150 having a laterally disposed crank arm to which the lever 151 is pivoted. At the other end the shaft 151 has a laterally disposed crank arm to which is pivotally secured a slide member 152 movably arranged in an opening of a guide 153 projecting from the outside of the gear case. The slide extends movably into the gear case, through an opening thereof, and has a recessed extremity 154 in engagement with a successively offset guide rib 155, carried by an extended part 156 of the controlling member 137.

The gear case is so proportioned and shaped that the gear member 132 and the gear 149, together with the parts controlling them, can be shifted and adjusted as necessary in the operation of the vehicle. The gear case has the rim lying in an inclined plane as is shown most clearly in Fig. 6, and is provided at the rim with an outwardly disposed flange 157. A gear case cover 158, conforming to the gear case, and shaped to permit the movements of the parts above referred to, is provided with a rim flange 159 adapted to fit upon the flange 157 to which it can be removably secured by means of bolts 160.

The gear 149 is movable in a plane alined with the gear 85, and when in its lowest position meshes with this gear. By sliding the gear member 132 longitudinally of the drum 119, the gears 133, 134 and 135 can be successively alined with the gears 85 and 149, the gear 149 being adapted to mesh with the small gear and intermediate gear of the member 132, while the large gear 135 is adapted to mesh with the gear 85. It will be understood that when the gear 85 is operatively connected with the gear 133 or the gear 134, by means of the gear 149, the axle 24 is driven in one direction, i. e., a direction such that the vehicle receives a forward movement. This direction is reversed when the gear 135 meshes directly with the gear 85. The shifting of the gear member 132 by means of the controlling member 137, at the same time shifts the gear 149, owing to the connecting devices between the controlling member 137 and the shaft 150.

When the gears are in the positions indicated in Fig. 1, the axle is driven forward at low speed, the gears 85, 149 and 133 being in mesh. When it is desired to increase the speed, the bell crank 42 is moved by means of the rod 145 to thrust the controlling member 137 in the direction of the length of the axle 24. This tends to move the gear 133 out of mesh with the gear 149 and to move the gear 134 into alinement with the latter. At the same time, the sliding engagement of the rib 155 and the slide member 152, owing to the offset form of the rib 155, swings the shaft 150 to move the arms 147 upward, to disengage the gear 149 from the gear with which it is in mesh, to permit the gear 133 to be swung into position in alinement with the gear 85 and in mesh with the gear 149. The guide rib 155 is so constructed that, when, after the next shifting in the same direction, of the member 137, the gear 135 meshes directly with the gear 85, the gear 149 is inoperative with respect to the large gear.

It will be noted that the crank shaft 77 is positioned below the center line of the cylinders. This arrangement presents a distinct advantage in that when the explosions take place, the cranks are at angles with the piston rods and not, as is usually the case, substantially in alinement therewith. This gives a decided increase in the power developed, owing to the improved leverage, due to the angular positions of the cranks relative to the piston rods.

Having thus described my invention, I claim as new, and desire to secure by Letters Patent:

1. Change speed gearing, comprising a driving shaft, a driven shaft, a set of gears slidably mounted upon said driven shaft and constrained to rotate therewith, a gear constrained to rotate with said driving shaft, an intermediate gear adapted operatively to connect said last-mentioned gear and any one of said first-mentioned gears, said intermediate gear being mounted to swing freely, means for shifting said first-mentioned set of gears, and means for swinging said intermediate gear bodily, said last-mentioned means being operable by said first-mentioned means.

2. Change speed gearing, comprising a driving shaft, a driving gear thereon, a driven shaft, a set of gears slidable with respect to said driven shaft and constrained to rotate therewith, said set of gears comprising gears of different diameters, one of said gears being adapted to mesh directly with said driving gear, and a bodily movable, intermediate gear adapted to mesh with said driving gear and each of said first-mentioned gears except said gear adapted to mesh directly with said driving gear.

3. Change speed gearing, comprising a driving shaft, a driving gear thereon, a driven shaft, a set of bodily movable gears constrained to rotate with said driven shaft and comprising gears of different diameters, a movable member for shifting said set of gears, a bodily movable, intermediate gear adapted to mesh with said driving gear and with certain of said gears comprising said set, and means operatively connecting said intermediate gear and said movable member, whereby said intermediate gear can be bodily moved when said set of gears is shifted, one of said set of gears being adapted to mesh directly with said driving gear.

4. Change speed gearing, comprising a driving member, a driven member, a set of gears movably associated with said driven member and constrained to rotate therewith, a gear constrained to rotate with said driving member, an intermediate gear adapted operatively to connect said last-mentioned gear and any one of said first-mentioned gears, said intermediate gear being mounted to move bodily toward and away from said driven member, means for moving said set of gears, and means operable by said first means, for moving said intermediate gear simultaneously with said set of gears.

5. Change speed gearing, comprising a driving shaft, a driving gear thereon, a driven shaft, a drum upon said driven shaft, a member slidably mounted upon said drum and constrained to rotate therewith, said member having a number of gears of different diameters, a shifting device for moving said member longitudinally of said drum, an intermediate gear for connecting said driving gear and said other gears, said intermediate gear being bodily movable, and a connection between said intermediate gear and said shifting member, whereby said intermediate gear is moved bodily as said member is shifted.

6. Change speed gearing, comprising a driving shaft, a driving gear thereon, a driven shaft, a drum upon said driven shaft, a member slidably mounted upon said drum and constrained to rotate therewith, said member having gears of different diameters, and annular ribs, a pivoted arm, an intermediate gear rotatably carried by said arm, a shifting member having a part slidably engaging said rib and operable to move said gear member longitudinally of said drum, said shifting member having a rib comprising successively offset parts, a slide engaging said rib and adapted to be actuated when said shifting member is moved, and a connection between said slide and said arm for moving bodily the intermediate gear when said member is shifted upon said drum.

7. In a vehicle, a motor having a driving shaft, a driving gear thereon, a clutch for operatively connecting said gear and said shaft, a driving axle, a drum upon said axle, a set of gears slidably mounted upon said drum and constrained to rotate therewith, a gear case, arms movably mounted within said gear case and rotatably carrying an intermediate gear adapted to connect said driving gear and certain of said set of gears, said set of gears having an annular rib, a shifting member having parts slidably engaging said rib and provided with a successively offset rib, a slide operatively engaging said last mentioned rib, and an operative connection between said slide and one of said arms.

In testimony whereof I have signed my name to this specification in the presence of two subscribing witnesses.

HOWARD G. CARR.

Witnesses:
GEORGE W. DALEY,
JOHN O. KLEIN.

---

Copies of this patent may be obtained for five cents each, by addressing the "Commissioner of Patents, Washington, D. C."